(12) United States Patent
Mohamed et al.

(10) Patent No.: US 7,539,722 B2
(45) Date of Patent: May 26, 2009

(54) METHOD AND SYSTEM FOR ACCESSING A FILE

(75) Inventors: Ahmed Hassan Mohamed, Sammamish, WA (US); David M. Kruse, Kirkland, WA (US); Anthony F. Voellm, Redmond, WA (US); Balan Sethu Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

(21) Appl. No.: 10/693,289

(22) Filed: Oct. 24, 2003

(65) Prior Publication Data

US 2005/0091212 A1    Apr. 28, 2005

(51) Int. Cl.
*G06F 15/16* (2006.01)
(52) U.S. Cl. .................................................. 709/203
(58) Field of Classification Search .......... 709/202–248
See application file for complete search history.

(56) References Cited

U.S. PATENT DOCUMENTS

| | | | |
|---|---|---|---|
| 5,896,500 A * | 4/1999 | Ludwig et al. .............. 709/204 |
| 6,108,300 A * | 8/2000 | Coile et al. .................. 370/217 |
| 6,279,054 B1 * | 8/2001 | Boyle ........................... 710/36 |
| 6,490,610 B1 * | 12/2002 | Rizvi et al. .................. 718/101 |
| 6,539,538 B1 * | 3/2003 | Brewster et al. ............. 717/115 |
| 6,854,072 B1 * | 2/2005 | Cagle et al. .................... 714/15 |
| 7,054,927 B2 * | 5/2006 | Ulrich et al. ................. 709/223 |
| 7,117,303 B1 * | 10/2006 | Zayas et al. .................. 711/112 |
| 7,206,963 B2 * | 4/2007 | Sidhu et al. ..................... 714/9 |
| 7,233,984 B2 * | 6/2007 | Mohamed et al. ........... 709/220 |
| 7,246,211 B1 * | 7/2007 | Beloussov et al. ........... 711/162 |
| 7,254,636 B1 * | 8/2007 | O'Toole et al. .............. 709/230 |
| 2002/0138559 A1 * | 9/2002 | Ulrich et al. ................. 709/203 |
| 2006/0173956 A1 * | 8/2006 | Ulrich et al. ................. 709/203 |

\* cited by examiner

*Primary Examiner*—Saleh Najjar
*Assistant Examiner*—Asad M Nawaz
(74) *Attorney, Agent, or Firm*—Workman Nydegger

(57) ABSTRACT

A method and system for providing state-full access to files and resuming access should a connection be broken. A resume key is returned to the client that allows the client to request a duplicate handle to an open file. The duplicate handle can be used to access the file in the same manner as the handle used to open the file. When a connection is broken, the file remains open on the server for a period of time and the state information associated with the file is maintained. Even if a connection is not broken, a client may request one or more duplicate handles and establish other channels (also known as connections) with which to access the file.

41 Claims, 7 Drawing Sheets

METHOD AND SYSTEM FOR ACCESSING A FILE

FIELD OF THE INVENTION

The present invention relates generally to computer systems, and more particularly to accessing files.

BACKGROUND

In the computer field there are two major approaches for handling file accesses: stateless and state-full. In the stateless approach, the information needed to access a file is sent with each file access request. In the state-full approach, a file is opened with certain attributes such as read only, locked, shared, and the like, and a handle is returned to the opened file. In each subsequent request for access to the file, the client sends the received handle together with any access request (e.g., read request, write request, or request to modify one or more attributes). The file system uses the handle to locate state regarding the file and processes the request.

Each approach to handling file accesses has advantages and disadvantages. In the stateless approach, a great deal of information is typically passed with each request. With each request, a client may be required to send data that identifies the file together with information that authenticates the client. A server receiving a request for a file access from the client may be required to authenticate the client and determine whether the client has rights to access the file in the manner requested. If a client frequently accesses a file to read or write small chunks of data, considerable overhead may occur for the client, the network or networks over which the access request passes, and a server servicing the file access request. In addition, a client may be required to keep track of where in the file the next read or write should occur. In stateless file accesses, a client is typically not allowed to lock a file for the client's exclusive use, as this requires state.

In the state-full approach, there are problems associated with what to do with an open file if a client crashes. A file that is opened and locked by a client that crashes may remain locked until a system administrator or other entity having authority over the file determines that the lock should be released. If a file lock is released and the client has not crashed but instead is just taking a long time to make its next file access request, this may cause errors on the client and/or consistency problems with the file.

Alternatively, or in addition, upon a client crash or connection disruption, a file may be closed and some state information associated with the file may be disposed of. When the file is re-opened, this state information may need to be reconstructed, resulting in extra processing and overhead.

What is needed is a method and system to provide fast state-full access to files while avoiding the disadvantages associated with state-full access.

SUMMARY

Briefly, the present invention provides a method and system for providing state-full access to files and for resuming access should a connection be broken. In one aspect of the invention, a resume key is returned to the client that allows the client to request a duplicate handle to an open file. The duplicate handle can be used to access the file in the same manner as the handle used to open the file. When a connection is broken, the file remains open on the server for a period of time and the state information associated with the file is maintained. If a request for a duplicate handle together with a resume key is received in time, the duplicate handle is returned to the client. The client may then use the duplicate handle to access the file as if the connection had never been broken. In essence, this provides a persistent handle to an open file.

In addition, even if a connection is not broken, a client may request one or more duplicate handles and establish other channels (also known as connections) with which to access the file. A duplicate handle may be set up to provide a fast path for reads and writes (e.g., over a channel that is optimized for reads and writes). Then, the client may access the file over any established channel using the appropriate handle.

Other advantages will become apparent from the following detailed description when taken in conjunction with the drawings, in which:

DETAILED DESCRIPTION

Exemplary Operating Environment

Figure 1:
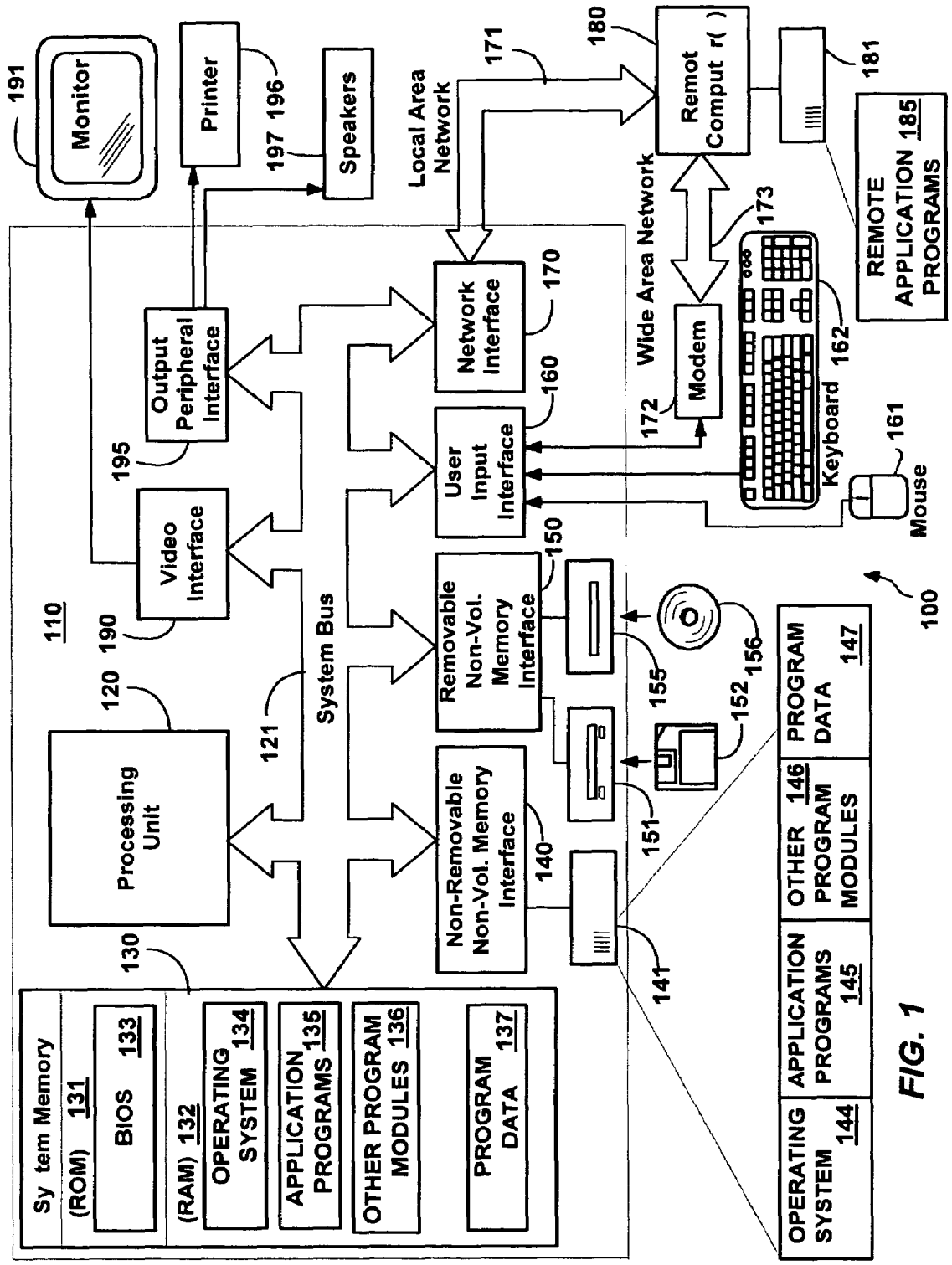
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combination of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data. Operating system 144, applications 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Systems for Accessing a File

Figure 2:
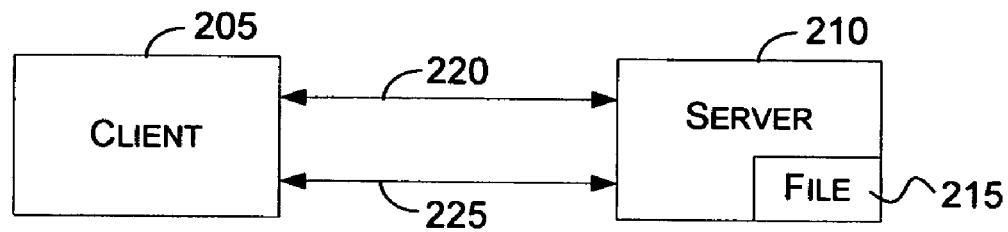
FIG. 2 is a block diagram representing a system in which a client accesses a file on a server through two communication channels in accordance with an aspect of the invention.

FIG. 2 is a block diagram representing a system in which a client accesses a file on a server through two communication channels in accordance with an aspect of the invention. A client 205 establishes a first connection with a server 210 through a channel 220. The client 205 authenticates itself and opens a file 215 by sending a file access request through the channel 220. The server 210 determines whether the client 205 is authentic and whether the client 205 has permission to access the file 215 in the manner requested. If so, the server 210 indicates to the client 205 that the file 215 is opened.

The client 205 may then query the server 210 for a resume key for the opened file. In some embodiments of the invention, the resume key is automatically returned without a separate query from the client 205 (e.g., when the server 210 indicates to the client 205 that the file 215 is opened).

The client 205 may then use the resume key on one or more other channels to obtain one or more other handles to the same opened file. Each other handle obtained in this way allows the same accesses to the file as the first handle.

It should be understood that obtaining a handle to the same open is different than opening the file via another channel and obtaining another handle to the file. For example, a client might obtain a handle to an open file and obtain a byte-range lock on the first 2,000 bytes of the file. If the same or another client attempts to open the same file and obtains another handle to the file and then attempts to modify bytes within the first 2,000 bytes of the file using the other handle, under normal file access mechanisms, the server would deny the client's request.

A client that obtains another handle to the open, however, can modify the first 2,000 bytes with the other handle. This is because the server treats accesses to the file through these special handles identically.

To keep the resume key secure, the resume key may be encrypted via a session key. After encrypting the resume key via a session key, the server 210 may then send the resume key to the client 205 via the first channel 220. Thereafter, to obtain other handles to the same open, the client 205 may sign the resume key and send it to the server 210. The server 210 may then verify the authenticity of the resume key and provide a duplicate handle to the open if appropriate.

To avoid replay of a resume key, several steps may be taken. Typically, a client receives a resume key through a first connection (e.g., the connection with which the client first opens the file). The first connection is associated with a session key. The client may wish to use the resume key to obtain a handle to the same open through a second connection. The second connection is associated with another session key. In conjunction with establishing the second connection, the client and/or server may each authenticate each other. To obtain the handle through the second connection, the client may sign the resume key with the session key associated with the first connection and encrypt the signed resume key using the session key associated with the second connection. The client may then send the encrypted and signed resume key through the second connection. The server then decrypts to obtain the signed key and validates the signature.

Alternatively, the client may sign the resume key with the session key associated with the first connection, re-sign the signed resume key with the session key associated with the second connection, and overwrite the old signature with the new signature. The client then sends the re-signed resume key through the second connection to the server. The server may then take the same steps the client did to verify that the signatures match.

In other environments, the resume key need not be encrypted or protected. For example, the resume key may be passed over a private network. In such cases, the resume key may be passed in plain text. It will be recognized that any mechanism or method for keeping the resume key secure (or not secure for that matter) may also be used without departing from the spirit or scope of the present invention.

The client 205 may give the resume key and any session key to one or more other clients (not shown). These other clients may then use the session key and resume key to obtain duplicate handles to the same open and access the file as if they had the first handle to the file.

The client 205 may include a cache that caches data sent to and returned from the file 215 on the server 210. File caching on the client 205 may be turned off whenever the client 205 establishes more than one handle to the same open. This may be done to speed reads and writes to the file, for cache consistency, or for other reasons depending on the application. In other embodiments, the client 205's cache manager (not shown) may cache data sent to and returned from a file on the server 210, even if the data is sent and received on more than one channel.

The client 205 may take advantage of remote direct memory access (RDMA) to speed access over one or more channels that access a single open. For example, the client 205 may establish a channel to access the file 215 using an RDMA channel. This may allow, among other things, direct transfer of data from the memory on one computer to another computer without processing by the CPU or operating system.

The channels 220 and 225 may be established over the same or different network interfaces. For example, one interface may be particularly suited for fast reads and writes while another interface may be more suited for performing other types of file accesses (e.g., opening, closing, and changing access modes for a file). In addition, the client 205 and the server 210 may both reside on the same computing device.

Figure 3:
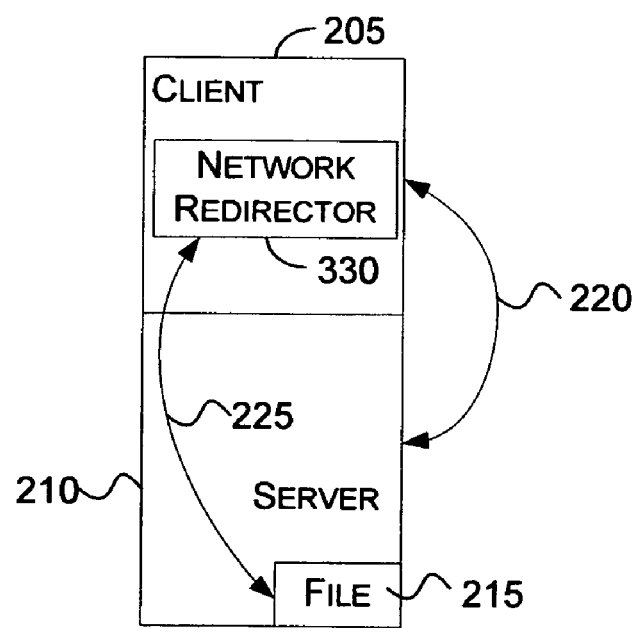
FIG. 3 is a block diagram representing a system in which a client accesses a file on a server through two channels and in which the client and the server reside on the same machine in accordance with an aspect of the invention.

FIG. 3 is a block diagram representing a system in which a client accesses a file on a server through two channels and in which the client and the server reside on the same machine in accordance with an aspect of the invention. A client 205 may use a network redirector to retrieve files. The network redirector may determine whether the file resides locally or remotely. If the file resides locally, the network director may send the file access request through a TCP/IP loopback path. The TCP/IP loopback path makes the request appear to go onto the network. It also makes the request appear to the server 210 to have come from the network. It will be recognized that this may be used, for example, to shield the redirector 330 from having to be aware of whether the file resides locally or remotely as both remote and local files are accessed through the same mechanism. It further simplifies the network redirector 330 as it can simply rely on the server 210 to determine whether the client 205 should be given the access rights it seeks. That is, by sending the request to the server 210, instead of trying to access the file directly, the network redirector 330 does not need to be aware of file access policies that may apply to the client 205's access to the file 215 as the server 210 does this.

After requesting access to the file 215, the network redirector 330 may then query the server 210 for a resume key for the file open for the file 215. For subsequent file access requests to the file 215, the network redirector 330 may use a channel 225 to access the file directly instead of going through the channel 220. As loopback paths can be quite slow (compared to direct access), this can speed file access considerably while still allowing the server 210 to determine whether the client 205 should be allowed the access it seeks with respect to the file 215.

The resume key may also be used to persist accesses to a file even if network connections between the client and server are temporarily disrupted. After a client obtains a resume key, the client can use the resume key to access the file through another channel. Should a first channel become unavailable (or disconnected), a client may use the resume key to establish another channel to the server to obtain access to the file.

The server may be configured to keep the file open to the client for a fixed or selectable amount of time or until another client requests access to the file. If the client does not access the file in the set amount of time and the server receives a request for access to the file from another client, the server may then close the file. If the client accesses the file (using the resume key) before the time expires, the server may assure or guarantee to the client that the file has not been changed since the client last accessed it. If the time has expired but no other changes have occurred to the file (e.g., another client did not request a change to the file), the server may inform the client that nothing has changed with the file since the client last opened the file. If the time expired and the file was changed by another client, the server may then tell the client that the file has been changed. This, in essence, amounts to a persistent handle to an open file that is resilient to network disruptions. It will be recognized that this has many applications with respect to databases, as database applications strive to maintain consistency and do not deal well with network disruptions.

To deal with server crashes or otherwise, the server may store resume keys and information associated with opened files in both volatile and non-volatile memory. The information associated with opened files may include session keys, authentication information, the mode in which the files were opened, other state information, and the like. The resume keys and information in volatile memory (e.g., RAM) may be used to provide quick access to files and duplicate handles to clients sending proper resume keys. The resume keys and information stored in non-volatile memory (e.g., a hard disk) may be used to reconstruct the resume keys and information in volatile memory should the server crash.

If the server crashes and reboots, a process may be executed early in the boot process to read the resume keys and open any previously opened files associated with the resume keys before any other entity can open the files. This may be done, for example, so as to guarantee to a client that uses a resume key to access an open, that the file has not been modified by another process. Using the information associated with the opened files, the files may be opened in the state they were before the server crashed. As described previously, the server may keep each file open for a fixed or selectable amount of time depending of whether a client that has a resume key requests access to the file associated with the resume key and/or whether another client requests access to the file.

A client may use one channel for encrypted data and another channel for unencrypted data. For example, when reading or writing data to a file, a client may use an encrypted channel. When reading attributes of a file, the client may use an unencrypted channel.

State Diagram of a System for Accessing a File

Figure 4:
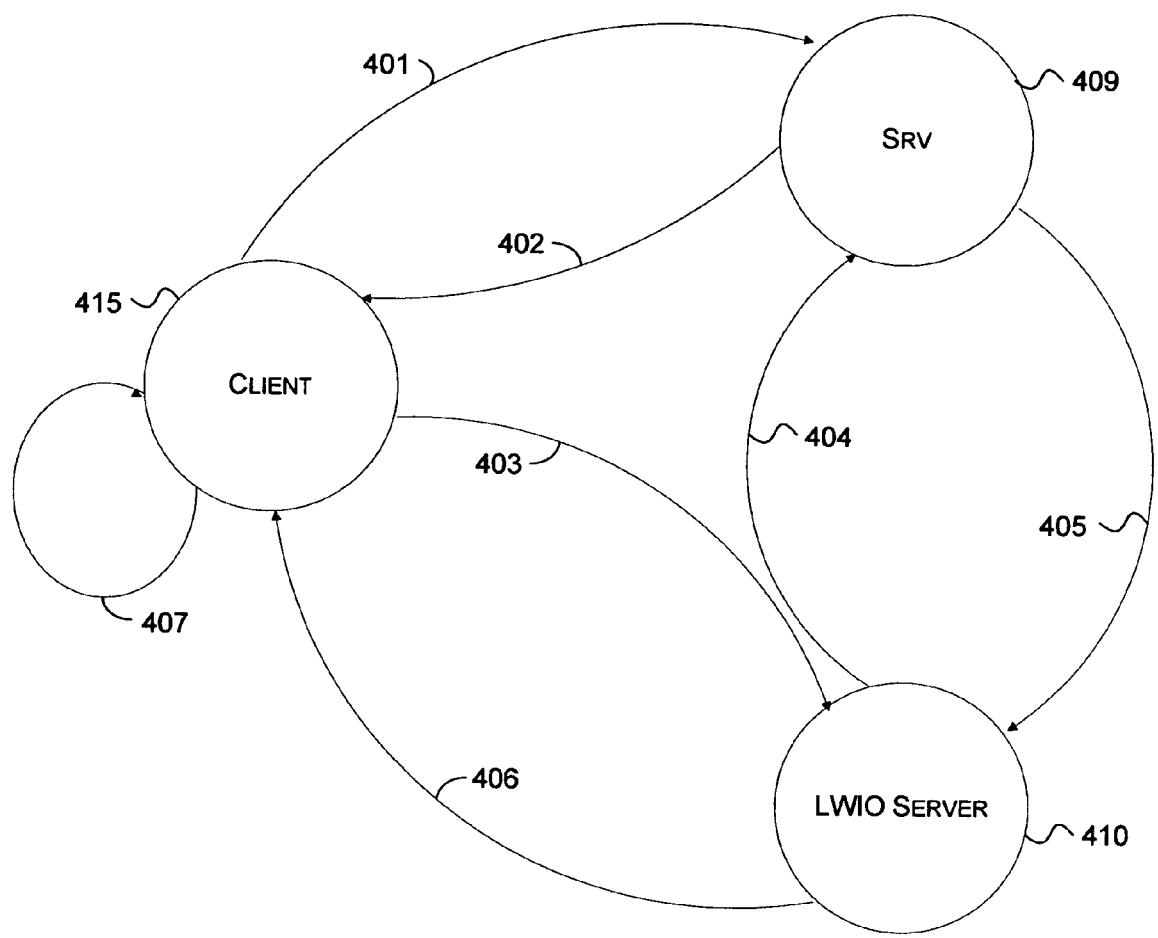
FIG. 4 is a block diagram representing states of one system operating in accordance with an aspect of the invention.

FIG. 4 is a block diagram representing states of one system operating in accordance with an aspect of the invention. Before the states in the state diagram occur, several things happen on a client and server. The server is turned on and boots up. A file server component (i.e., SRV 409) in the kernel of the server is initialized and is ready to receive requests for file accesses. A component for receiving requests for handles to open files is initialized. This component is sometimes referred to as a light weight input/output server (LWIO Server) (e.g., LWIO Server 410).

Figure 5:
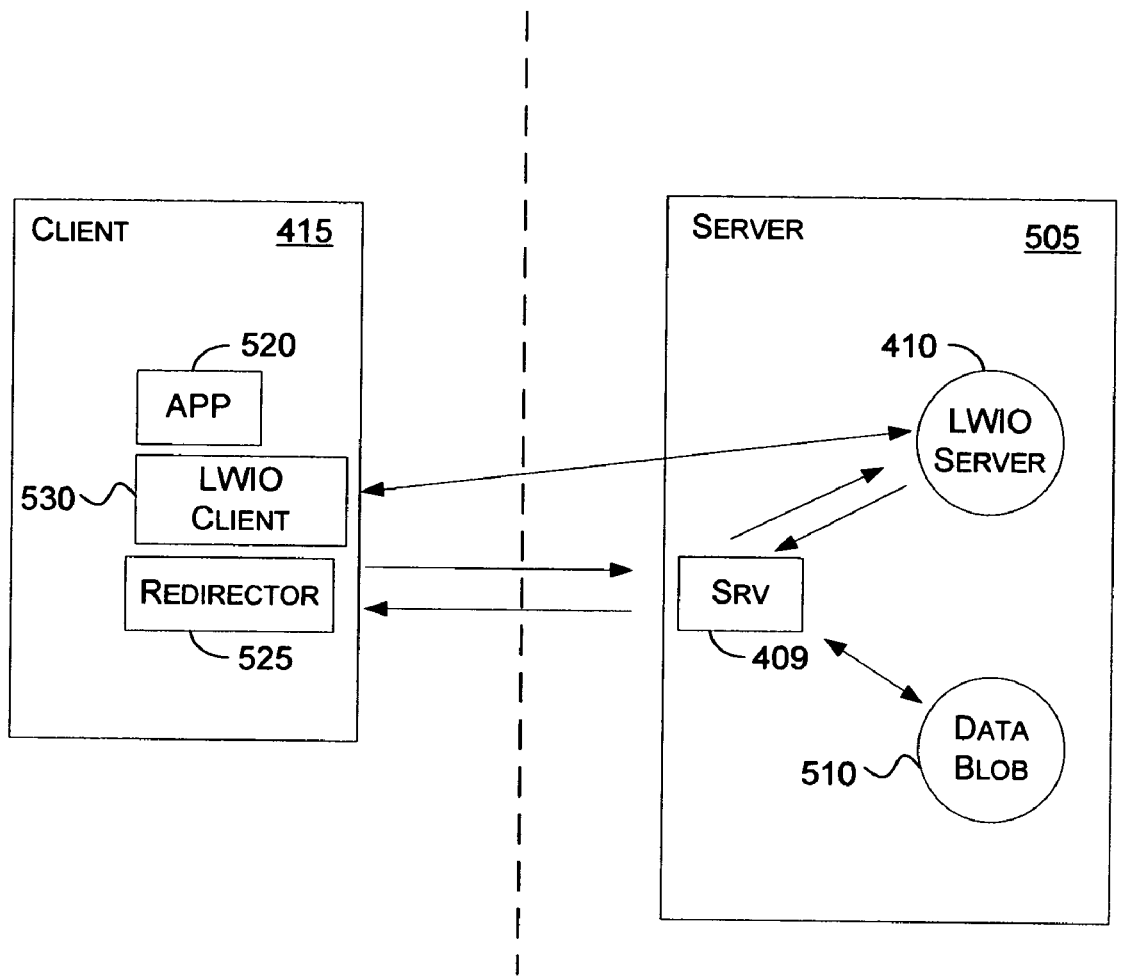
FIG. 5 is a block diagram representing a system used to illustrate examples of the states referenced in FIG. 4 according to an aspect of the invention.

For example, referring to FIG. 5, a server 505 boots up. A SRV 409 is initialized and ready to receive requests for accesses to files. A LWIO Server 410 is also initialized and ready to receive requests.

After SRV 409 and the LWIO server 410 are initialized and ready to receive requests, the LWIO server 410 registers a data blob with SRV 409. When the LWIO server 410 registers with the SRV 409, this indicates to the SRV 409 that the LWIO server 410 exists and that clients may begin requesting resume keys. The SRV 409 stores the data blob in a storage medium accessible to SRV 409. When the client requests a resume key, the data blob that the server 410 registers with the SRV 409 will be conveyed to the client together with the resume key. The data blob may include any data in any format without departing from the spirit or scope of the invention. The data blob may include, for example, the time at which the server was booted, network capabilities, what kinds of services the server supports, or any other data.

For example, referring to FIG. 5, the LWIO server 410 registers a data blob 510 with the SRV 409. The SRV 409 stores the data blob on a storage medium accessible by the SRV 409.

At transition 401, via a redirector, a client 415 sends an open file request to the SRV 409. The SRV 409 opens the requested file and returns a file ID (FID), a resume key that it generates, the data blob registered in the first step by the LWIO Server 410, and challenge data to the redirector. The FID is used by the redirector to issue file I/O requests to the SRV 409 for the file it opened on behalf of the client 415. The resume key is unique to the file just opened. It may be stored in a table or other data structure accessible to the SRV 409 for easy access. The challenge data is used as part of the authentication step by the client 415.

For example, referring to FIG. 5, a client application 520 sends an open file request via a redirector 525. The open file request is sent to the SRV 409. The SRV 409 opens the requested file and prepares to returns the information including the data blob 510.

At transition 402, the SRV 409 returns a file ID. The client 415 then receives a file handle from the redirector indicating the open was successful and queries the redirector for the data blob, server resume key, and challenge data that the SRV 409 returned. At this point, the client can interpret the data blob and contact the LWIO server 410.

For example, referring to FIG. 5, the SRV 409 returns the FID and other information. The client application 520 receives the information and may interpret the data in the data blob 510 in order to contact the LWIO Server 410.

At transition 403, the client 415 opens a connection to the LWIO Server 410. The client 415 sends the LWIO Server 410 the server resume key, signed challenge data, and its own challenge response data in a registration request to get a FID for the new connection. For example, referring to FIG. 5, the client application 520 sends the data to the LWIO Server 410 via the LWIO client 530.

At transition 404, the LWIO Server 410 sends the server resume key, signed challenge data, and challenge response data to the SRV 409. The SRV 409 locates file information using the resume key and validates the signed data. The SRV 409 then duplicates the original file handle used to open the file. For example, referring to FIG. 5, the LWIO server 410 sends the information received from the LWIO client 530 to the SRV 409.

At transition 405, the SRV 409 returns the duplicated file handle together with signed challenge response data to the LWIO Server 410. At this time there are two separate processes (i.e., the LWIO server 410 and the SRV 409) that share a common resource (file object) and the LWIO Server 410 has authenticated the client 415. For example, referring to FIG. 5, the SRV 409 returns the duplicated file handle and signed challenge response data to the LWIO Server 410.

At transition 406, the LWIO server 410, returns a FID for the duplicated file handle and signed challenge response data to the client 415. For example, referring to FIG. 5, the LWIO Server 410 returns the information to the LWIO client 530, which passes it to the client application 520.

At transition 407, the client 415 validates the signed challenge response to authenticate the LWIO Server 410. For example, referring to FIG. 5, the client application 520 authenticates the LWIO server 410. At this point, client application 520 may use either connection to access the opened file on the SRV 409.

Any requests to be sent over the new connection are intercepted by the LWIO client 530 and sent to LWIO server 410 together with the resume key and signing that authenticates the client. The LWIO server 410 then uses the data to authenticate the client and the resume key sent from the LWIO client 530 to access the file and read or write data.

The client may use either connection to access the file. Accesses over both connections may take place simultaneously.

In some embodiments of the invention, the client 415 requests the resume key in a query separate from the initial opening of the file. In other embodiments of the invention, the resume key is automatically sent to the client 415 whenever a client opens a file.

Data Structure of an Exemplary Resume Key

Figure 6:
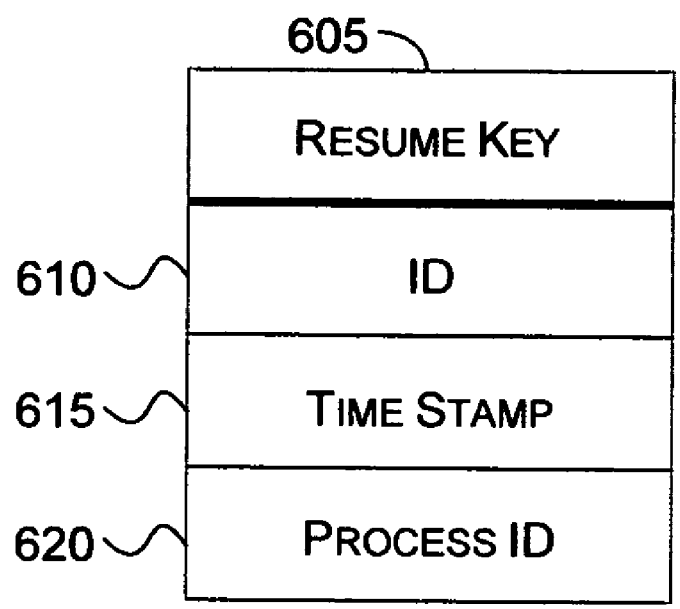
FIG. 6 is a block diagram representing a data structure that may be used for the resume key according to an aspect of the invention.

FIG. 6 is a block diagram representing a data structure that may be used for the resume key according to an aspect of the invention. An ID field 610 includes information that is used to locate a particular open file in a server's internal table. The server's internal table indicates the files the server has open.

A time stamp field 615 includes information that indicates when the file was opened. This may be used, for example, to limit the time that the server will keep a file opened if no requests to access the file are received (e.g., to avoid having a file locked by a process that has crashed).

A process ID field 620 includes information that identifies the process that opened the file. The process ID field 620 may be used to identify byte-range locks and properties across processes. The information in the resume key may be used to index other state information regarding an open. Each of the fields in the resume key 605 may be sixty-four bytes or any other convenient length.

A client should treat the resume key 605 as an opaque block. That is, the client should not rely on any information found in the resume key 605. This should be done so that the resume key 605 may be changed for server convenience or otherwise without changing code on the client.

Other Systems for Accessing a File

Figure 7:
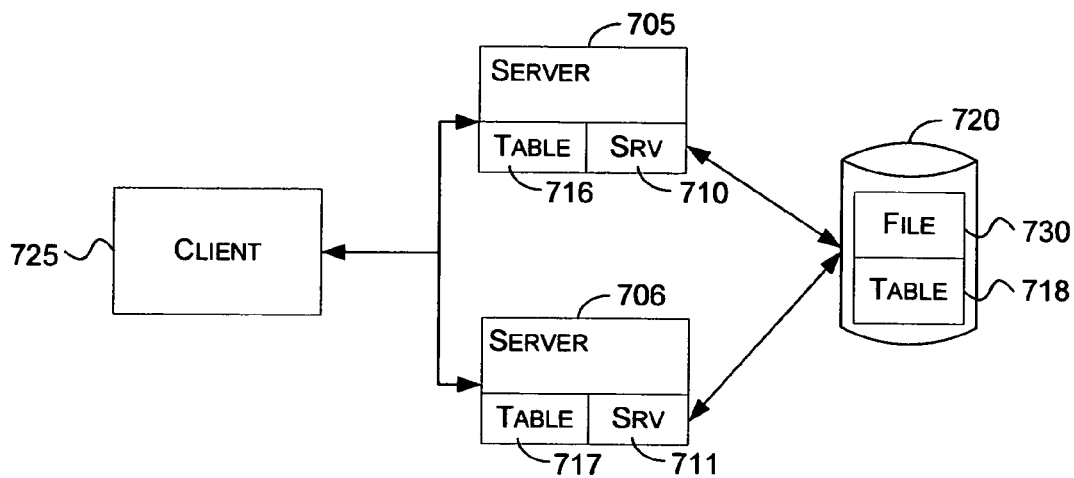
FIG. 7 is a block diagram representing a system configured to operate in a server cluster environment in accordance with an aspect of the invention.

FIG. 7 is a block diagram representing a system configured to operate in a server cluster environment in accordance with an aspect of the invention. Servers 705 and 706 may be arranged in a cluster. In this arrangement, they share a disk 720. Only one of the servers 705 and 706 may own (i.e., control) the disk 720 at a time. In a failover scenario, the disk 720 becomes owned by the server that did not fail.

A scenario in which one of the servers crashes and the other server takes over is illustrative in describing how an aspect of the invention can persist resume keys even through a failover. In this scenario, the client 725 sends a request to access a file 730 to the cluster. Through a server component (i.e., a SRV 710) the active server (i.e., the server 705) requests that the file 730 be opened on the disk 720. The client 725 requests a resume key for the open to the file 730. Together with returning the resume key to the client 725, the resume key is also stored in a table on the server 705 (i.e., a table 716) and a table on the disk 720 (i.e., a table 718). Then, the server 705 crashes.

When the server 705 crashes, the server 706 takes ownership of the disk 720. The server 706 then rebuilds a resume key table 716 from the table 718 stored on the disk 720. The client 725 tries to establish a connection to access the file 730. Typically, unknown to the client 725, this connection is established through the server 706. The client 725 sends the resume key through the connection to the server 706, which is then able to use the table 717 to access the file 730.

The server 706 may include a service (not shown) that takes certain actions when the server 705 crashes. For example, as soon as the server 705 crashes and the server 706 takes over ownership of the disk 720, the service may read the resume key table 718 on the disk 720 and open any opened files before any other entity can open the files. This may be done, for example, so as to guarantee to a client that uses a resume key to access an open, that the file has not been modified by another process. In addition, other state information may be stored on the disk 720, such as locks and other state information regarding the file 730. In one embodiment, the service may obtain this information from the disk 720 and restore state information regarding opened files on the server 706. In another embodiment of the invention, when the file 730 has certain kinds of state information (e.g., the file 730 was opened with a lock), instead of attempting to restore the state information, for simplicity, the service may indicate that the resume key can no longer be used to obtain a duplicate handle to the file 730.

Figure 8:
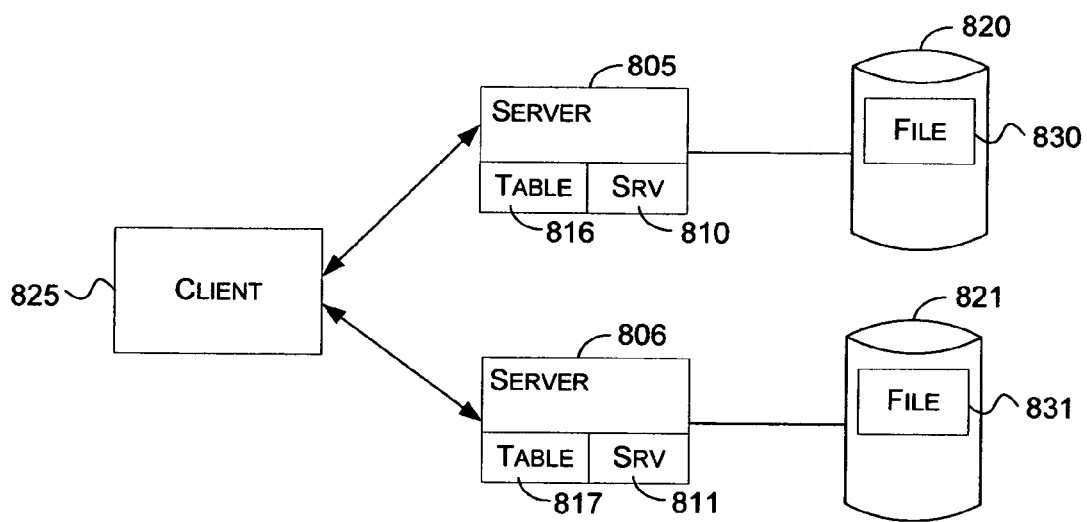
FIG. 8 is a block diagram representing a system configured to operate in a distributed file system environment in accordance with an aspect of the invention.

FIG. 8 is a block diagram representing a system configured to operate in a distributed file system environment in accordance with an aspect of the invention. Servers 805 and 806 are similar to server 705 and 706 of FIG. 7. Each of the servers 805 and 806, however, has its own separate storage (i.e., one of disks 820 and 821). In one aspect of the invention, the disks 820 and 821 are read-only for clients that are trying to access information on the disks. In addition, the disks 820 and 821 may include the same data. For example, a company may wish to provide fast access to the company's web site from various locations around the world. To do this, the company may set up servers around the world each with its own disk that has data and programs from which the company's web site can be constructed. Then, clients that wish to view pages of the company's web site may be directed to a particular server depending on which server can best serve each client's request. A file replication system may be used to distribute the content to the servers.

When a client 825 wishes to access a file, the client 825 may first ask a distributed file system server (not shown) which server the client should request the file from. Assume, for example, that the distributed file system server told the client 825 that it could access the file from the server 805. The client 825 then requests access to the file from the server 805. Through a server component (i.e., a SRV 810) the server 805 requests that the file 830 be opened on disk 820. The client 825 then requests (or is automatically given) the resume key for the file 830.

A system administrator may decide that the server 805 should be shut down for administrative reasons. Upon notification that it will shortly be shut down, the server 805 may begin migrating resume keys for its open files to the server 806. When the client 825 requests a handle to an open using a resume key that has been migrated to the server 806, the server 805 may inform the client 825 that the client 825 can access the file at the server 806. The client 825 may then open a connection with the server 806, send the resume key, and obtain a handle to an open for a file 831 that corresponds to the file 830.

Flowchart

Figure 9:
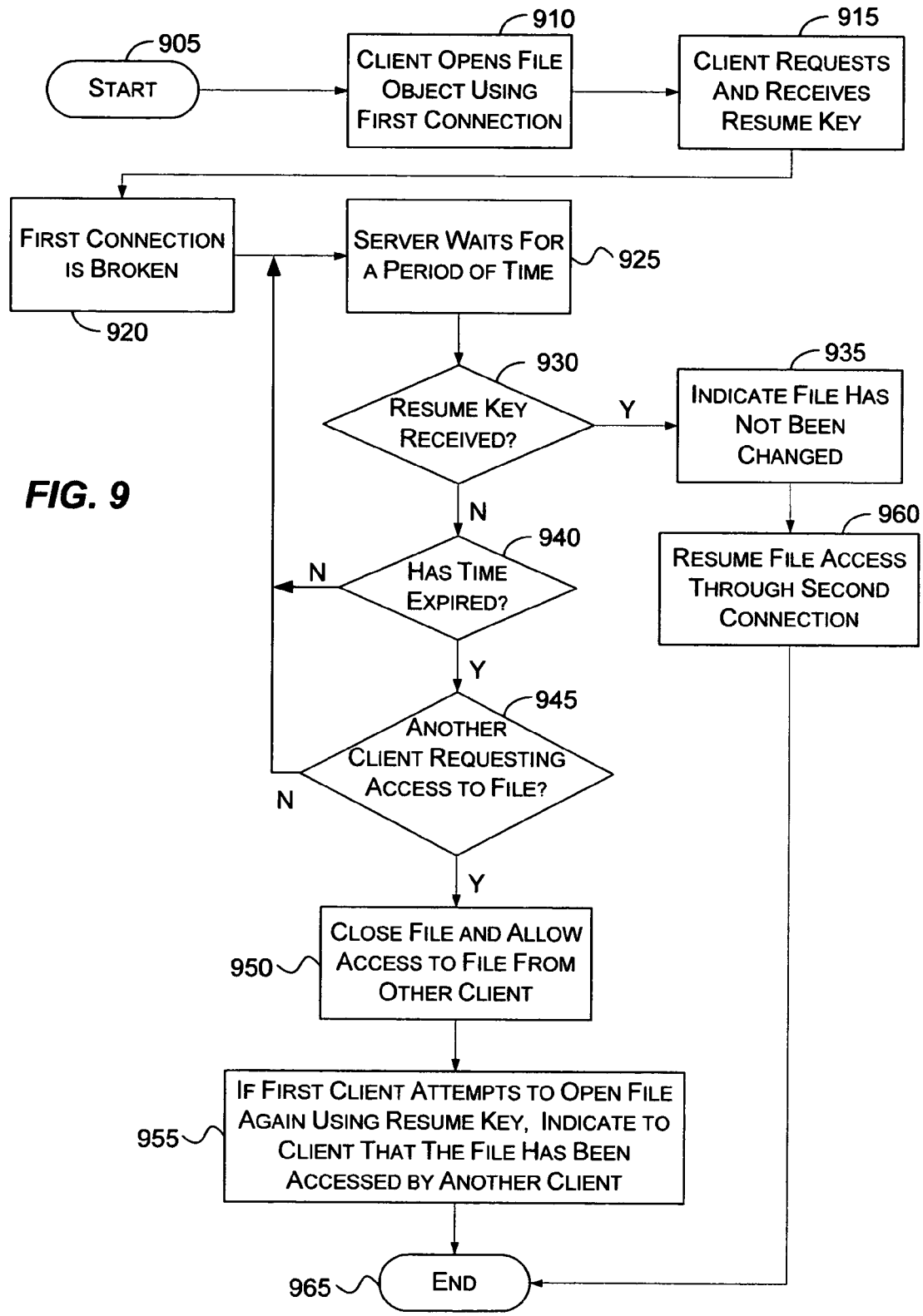
FIG. 9 is a dataflow diagram that generally represents exemplary steps that may occur when using a resuming key, in accordance with aspects of the present invention.

FIG. 9 is a dataflow diagram that generally represents exemplary steps that may occur when using a resuming key, in accordance with aspects of the present invention. The process begins at block 905. At block 910, a first client opens a file object using a first connection. At block 915, the client requests and receives the resume key. At block 920, the first connection is broken. This may occur because of a network disruption or otherwise. At block 925, the server waits for a period of time. If the resume key is received before a time has expired or before another client has requested access to the file (blocks 930, 940, and 945), processing continues at block 935. If the resume key has not been received, processing continues at block 940. At block 940, if the time has expired, processing continues at block 945; otherwise, the server waits for a period of time (block 925). At block 945, if another client is not requesting access to the file, processing continues at block 925.

Note that blocks 930, 940, and 945 may be executed in any order and may be triggered by an event (e.g., the server receives a request from another client that is requesting access to the file, the server receives the resume key, or some other event).

At block 945, if the time has expired (which it has if this block has been reached) and another client is requesting access to the file, processing continues at block 950. At block 950, the file open is closed and the other client is allowed access to the file. At block 955, if the first client attempts to access the open file using the resume key, the first client is informed that the file is no longer accessible through the resume key and that the file has been accessed by another client, which may have changed the file.

If the resume key is received either 1) before the time has expired or 2) before another client requests access to the file, processing branches from block 930 to block 935. At block 935, the client is informed either explicitly (e.g., through a message) or implicitly (e.g., by allowing access through the resume key) that the file has not been changed by another client. At block 960, file access is resumed through the second connection from the first client. At block 965, processing ends. This process may be executed each time a resume key is returned by a server.

As can be seen from the foregoing detailed description, there is provided an improved method and system for accessing files. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer storage medium for use in a system that provides state-full access to a file and for implementing a method for accessing the file through a duplicate handle, the computer storage medium comprising:
   stored computer-executable instructions for performing the method, the method comprising:
      a server receiving a request from a client through a first channel to open a file residing on the server, the file having state information associated therewith;
      in response to the request, the server sending a first handle to the client to use to access data in the file and at least part of the state information associated therewith, the first handle having access rights to the file;
      the server sending a resume key to the client by which a duplicate handle may be requested, the duplicate handle having access rights to the file that correspond to the first handle;
      the server receiving a new request from the client through a second channel for a duplicate handle to the file, the new request being sent with the resume key;
      the server sending the duplicate handle to the client in response to receiving the new request for a duplicate handle and the resume key; and
      the server providing the client with access to the file via the duplicate handle.

2. The computer storage medium of claim 1, wherein the state information includes a mode in which the file is opened.

3. The computer storage medium of claim 2, wherein the mode includes at least one of read only, read/write, a lock, and a mode in which the file is opened for exclusive use by the handle and any duplicates thereof.

4. The computer storage medium of claim 3, wherein the lock comprises a range that indicates bytes of the file that can only be accessed by the first handle and any duplicates thereof.

5. The computer storage medium of claim 1, further comprising authenticating a client that sends any request.

6. The computer storage medium of claim 5, further comprising authenticating a server that sends any response.

7. The computer storage medium of claim 1, wherein unencrypted information is sent over the first channel and encrypted information is sent over the second channel.

8. The computer storage medium of claim 1, wherein the channels pass through a single network interface on a single client.

9. The computer storage medium of claim 1, wherein the channels pass through at least two interfaces on a single client.

10. The computer storage medium of claim 1, wherein the first channel is disconnected and wherein the file remains open afterwards.

11. The computer storage medium of claim 10, wherein the resume key is received after the first channel has become disconnected.

12. The computer storage medium of claim 1, wherein the first channel is disconnected and wherein the file remains open afterwards at least until another client requests access to the file.

13. The computer storage medium of claim 12, wherein if the other client requests access to the file before a time has expired, the other client is denied access to the file.

14. The computer storage medium of claim 12, wherein if the other client requests access to the file after the time has expired, the file is closed and the other client is granted access to the file.

15. The computer storage medium of claim 14, wherein the client is informed that the file has been accessed by another client after the client sends the resume key with a request for a duplicate handle.

16. The computer storage medium of claim 12, wherein after the resume key is received, the client is informed that the file has not been changed by another client.

17. The computer storage medium of claim 1, wherein the request to open the file is sent from a first client and the duplicate handle is sent to a second client.

18. The computer storage medium of claim 17, wherein the first client sends the duplicate handle to the second client.

19. The computer storage medium of claim 17, wherein the second client receives the duplicate handle from a server that provides access to the file.

20. A computer storage medium for use in a system that provides state-full access to a file and for implementing a method for accessing a file through a duplicate handle, the computer storage medium comprising:
stored computer-executable instructions for performing the method, the method comprising:
a client sending a request to a server through a first channel to open a file in a file access mode including data indicative of access rights, the file residing on the server;
the client receiving a first handle to use to access data in the file in accordance with the access rights, the first handle providing access to all or part of any state information associated with the file;
the client receiving a resume key by which a duplicate handle may be requested:
the client sending the resume key to the server with a new request for a duplicate handle through a second channel, the duplicate handle having access rights that correspond to the access rights of the first handle;
the client receiving the duplicate handle; and
the client accessing the file via the duplicate handle.

21. The computer storage medium of claim 20, further comprising the client requesting the resume key.

22. The computer storage medium of claim 20, wherein the resume key is automatically returned.

23. The computer storage medium of claim 20, wherein the file is accessed via the first handle over the first channel and the file is accessed via the duplicate handle over the second channel.

24. The computer storage medium of claim 23, wherein the second channel comprises a remote direct memory access (RDMA) channel in which data can be transferred from a client to a server without assistance from a central processing unit (CPU) on either the client or the server.

25. The computer storage medium of claim 23, wherein the first channel is closed before the second channel is established.

26. The computer storage medium of claim 25, wherein the file remains open after the first channel is closed.

27. The computer storage medium of claim 20, wherein the file access mode comprises a mode of exclusive use by the handle and any duplicates thereof.

28. The computer storage medium of claim 20, wherein the mode comprises an exclusive lock on a range of bytes in the file.

29. The computer storage medium of claim 28, wherein the range of bytes is accessed via the duplicate handle.

30. A computer storage medium for use in a system that provides state-full access to a file and for implementing a method for accessing the file through a duplicate handle, the computer storage medium comprising:
stored computer-executable instructions for performing the method, the method comprising:
a client requesting to open a file in a mode comprising a set of one or more access rights and associating state information therewith, the file being stored on a server;
the client obtaining a first handle to the file, the first handle capable of accessing the file in accordance with any access right included in the mode, the first handle obtained via a first channel;
the client obtaining a resume key with which to request a duplicate handle, the duplicate handle capable of accessing the file in any way in which the first handle is capable; closing the first channel and keeping the file open afterwards;
the client sending a new request for the duplicate handle together with the resume key, the request being sent via a second channel; and
the client accessing the file via the duplicate handle.

31. The computer storage medium of claim 30, wherein closing the first channel comprises a whole or partial network outage that disrupts the first channel.

32. The computer storage medium of claim 30, wherein closing the first channel comprises rebooting a machine associated with the first channel.

33. The computer storage medium of claim 32, wherein the machine is the client accessing the file via the first handle.

34. The computer storage medium of claim 32, wherein the machine is the server providing access to the file.

35. A computer storage medium having stored computer-executable instructions for use in a system that provides state-full access to a file and for implementing a method for accessing a file through a duplicate handle, the method comprising:
a client using a network redirector to request a first handle to open a file, the request being made via a loopback path, the first handle capable of accessing the file in accordance with any rights granted while opening the file, the file being stored on a server;
after requesting the first handle via the loopback path, the client requesting subsequent accesses to the file through a separate channel;
the client obtaining a resume key with which to request a duplicate handle, the duplicate handle capable of accessing the file in any way in which the first handle is capable; and
the client using at least the resume key to obtain the duplicate handle to the file and thereafter performing any read or write access to the file via the duplicate handle.

36. The computer storage medium of claim 35, wherein a the client and the server both reside on a single machine.

37. The computer storage medium of claim 35, wherein the loopback path comprises a transmission control protocol/internet protocol (TCP/IP) stack.

38. The computer storage medium of claim 35, wherein the resume key comprises a file identifier that identifies an open file, a time stamp, and a process identifier that identifies a process associated with the resume key.

39. The computer storage medium of claim 38, wherein at least part of the resume key provides an index for other state information associated with the file.

40. A system for accessing a file through a duplicate handle, comprising:
   a client that performs the following steps:
      sending a request through a first channel to open a file residing on a server, the file having state information associated therewith;
      receiving a first handle to the file and a resume key, the first handle having access rights the file
      sending a request through a second channel for a duplicate handle together with the resume key, the duplicate handle having access rights to the file that correspond to the first handle; and
      accessing the file via the first and duplicate handles; and
   a plurality of servers associated with a data store, only an active one of the plurality of servers controlling the data store at a time, the plurality of servers configured in a redundant relationship wherein in response to the active server going offline another one of the plurality of servers becoming active and taking control of the data store, the data store comprising open files including the file and a data structure including resume keys to obtain duplicate handles for the open files, wherein after the active server goes offline, the other server that becomes active builds a data structure that is included on the other server and resume places keys stored in the data store therein, so that the other server may provide a duplicate handle in response to a request for the duplicate handle from the client.

41. A system for accessing a file through a duplicate handle, comprising:
   a client that performs the following steps:
      sending a request through a first channel to open a file residing on a server, the file having state information associated therewith;
      receiving a first handle to the file and a resume key, the first handle having access rights to the file
      sending a request through a second channel for a duplicate handle together with the resume key, the duplicate handle having access rights to the file that correspond to the first handle; and
      accessing the file via the first and duplicate handles;
   a plurality of data stores that operate in a distributed file system; and
   a plurality of servers, each server associated with one of the data stores, each server including a data structure comprising resume keys to use in providing duplicate handles for the open files included on the data store associated with the server,
   wherein in response to a first server being notified that it will be taken offline, the first server sending data including resume keys from its data structure to a second server and refers any requests for access to files associated with the sent data to the second server, the second server providing access to the file thereafter, the second server incorporating the data into the data structure included on the second server, so that the second server provides a duplicate handle in response to a request for the duplicate handle from the client.

* * * * *